United States Patent [19]

Tschamper

[11] 4,234,559
[45] Nov. 18, 1980

[54] PROCESS FOR THE MANUFACTURE OF COARSE ALUMINUM HYDROXIDE

[75] Inventor: Otto Tschamper, Volketswil, Switzerland

[73] Assignee: Swiss Aluminium Ltd., Chippis, Switzerland

[21] Appl. No.: 87,663

[22] Filed: Oct. 24, 1979

[30] Foreign Application Priority Data

Nov. 7, 1978 [CH] Switzerland ............... 11428/78

[51] Int. Cl.³ .................................. C01F 7/14
[52] U.S. Cl. ........................... 423/629; 23/301; 23/305 A; 423/121; 423/127
[58] Field of Search ............... 23/301 R, 305 A; 423/121, 122, 127, 629

[56] References Cited

U.S. PATENT DOCUMENTS

| | | | |
|---|---|---|---|
| 2,657,978 | 11/1953 | Johnson | 423/122 |
| 2,707,669 | 5/1955 | Houston et al. | 423/127 |
| 3,486,850 | 12/1969 | Day | 423/127 |
| 3,649,184 | 3/1972 | Featherson | 423/629 |
| 3,906,084 | 9/1975 | Gnyra | 423/629 |

FOREIGN PATENT DOCUMENTS

1391596 1/1965 France .................. 423/122

*Primary Examiner*—Herbert T. Carter
*Attorney, Agent, or Firm*—Bachman and LaPointe

[57] ABSTRACT

Process for the manufacture of coarse aluminum hydroxide, containing a maximum of 15 weight percent of the particles in a particle size under 45 micrometers, with a productivity that may be higher than 60 grams of precipitated $Al_2O_3$.

The process consists of a decomposition in two stages (an agglomeration phase and a growth phase); each stage proceeding within defined temperature ranges with seed material of different constitution. The first (fine) seed amount is added at the start of the decomposition in such an amount, that the ratio of the supersaturation of the aluminate liquor to the surface area of the seed hydroxide per liter of the aluminate liquor presented for decomposition exhibits a value of 7 to 25 grams per square meter. The process exhibits the advantage of the high productivity of the so-called European process and the advantage of the so-called American process by obtaining a coarse product hydroxide.

10 Claims, 3 Drawing Figures

PROCESS FOR THE MANUFACTURE OF COARSE ALUMINUM HYDROXIDE

BACKGROUND OF THE INVENTION

The invention concerns a process for the manufacture of coarse aluminum hydroxide, for example via the Bayer process, in which bauxite is digested with an aqueous sodium aluminate liquor, so that the aluminum oxide contained in the bauxite goes into solution. The crystallization (hereinafter referred to as decomposition) of aluminum hydroxide results from the seeding of the filtered, supersaturated sodium aluminate solution with finely divided aluminum hydroxide.

In particular, it concerns a process for the crystallization of an aluminum hydroxide of coarse particle size, which contains a maximum of approximately 15 percent by weight of the particles of a particle size under 45 micrometers, from a supersaturated, alkaline aluminate solution obtained for example from the familiar Bayer process.

The decomposition proceeds in two stages through the addition of aluminum hydroxide seed of different constitution in the referred to aluminate solution in each of the two stages.

Two processes for the manufacture of aluminum oxide by the Bayer process find large scale application today, namely that usual in European plants and that practiced in American plants.

The process usual in European plants employs a high $Na_2O$ concentration, up to 140 g/l, for the decomposition. So that a good productivity may be obtained at this high liquor concentration, the decomposition is carried out using a sufficiently great amount of seed hydroxide, for example 200–250 g $Al(OH)_3$/l (and more) at a sufficiently low enough temperature, for example at 55° C. or less. Productivities of up to 80 g of aluminum hydroxide per liter are thereby obtained. However, the precipitated hydroxide in such plant is finer than that produced in American plants. As long as the fine hydroxide from these plants is calcined at high temperatures, an oxide with little tendency towards dustiness is obtained. However, the introduction of the dry scrubbing of waste gases demands an oxide with a BET-surface area between 30 and 60 square meters per gram, which can only be obtained by a weak calcination of the aluminum hydroxide. However, a weak calcination of the fine aluminum hydroxide produced in European plants gives an oxide with a strong tendency to dustiness, which is not readily acceptable to the consumer.

The process practiced in American plants is so designed to produce a coarse hydroxide, which, under the weak calcination usual in these plants, results in an oxide with little tendency to dustiness. In order to manufacture a coarse hydrate, a liquor concentration normally under 110 grams $Na_2O$ caustic per liter is chosen in the American process. The starting temperature is high, for example 70° C., and the amount of seed material low, for example 50–120 grams $Al(OH)_3$ per liter. If too low a starting temperature for the decomposition is chosen, and the amount of seed hydroxide too high, then a fine product is obtained. The conditions in the American process for the production of the desired coarse product are in opposition to a good liquor productivity. The lower liquor productivity of this process is shown in that at best about 55 grams of aluminum oxide per liter of liquor is produced in opposition to a productivity of up to 80 grams per liter from the European process. Expressed in another way, under the American process, 18–20 cubic meters of liquor need to be decomposed to produce a ton of aluminum oxide, compared to only about 13 cubic meters for the European process.

As already referred to above, a coarse aluminum hydroxide, as produced in American plants and not produced in European plants, is required for the production of a weakly calcined aluminum oxide with a BET surface area of 30 to 60 square meters per gram. European plants could very well adapt the American practice, however, the productivity of the European plants would fall about 30–40 percent, with a corresponding rise in heat consumption per ton of aluminum oxide. It is therefore very desirable that the European plants have a process which allows the production of a coarse aluminum hydroxide, without however having to accept a reduction in capacity of the plant with a corresponding increase in the specific heat consumption of the manufactured product.

On the other hand, it is very desirable to lift the productivity of American plants to the level of European plants while maintaining the coarse product quality. Such an improvement in the American plants would mean an increase in capacity, accompanied by a reduction in the specific heat consumption per ton of manufactured aluminum oxide.

To the present time, there has been no lack of proposals as to how this aim of a coarse product and high productivity may be achieved. In U.S. Pat. No. 2,657,978, it is suggested to modify the American process so that the seed material addition proceeds in two steps. In the first step, only sufficient seed is added to promote a strong coarsening. This is then followed by a second addition so that a good productivity is achieved. By the fixing of the referred to caustic concentration at about 85 grams per liter $Na_2O$, a productivity of about 48 grams $Al_2O_3$ per liter of liquor to be decomposed may be arrived at for this process. This may be compared with a productivity of about 45 grams per liter for the unmodified process with a single addition of seed, where a reaction time of 35 hours is employed in both cases. The increase in productivity is thus calculated to be about 6.5 percent.

In FR Pat. No. 1,391,596 a two-stage process with two decomposing chains is described, which, with a decomposition time of 30–40 hours, results in a productivity increase of 6.4% and a coarser product than that obtained with the normal one-stage American process. Although no absolute figures as to the productivity are given in this patent, this would not greatly exceed that in the previously quoted U.S. Pat. No. 2,657,978. The process consists of two decomposition chains, wherein one recieves fine seed in an amount and under such conditions which allows agglomeration to occur, and where the other is treated with coarse hydroxide in an amount and under such conditions that growth of the crystals results. Following the separation of the coarse product hydroxide and the coarse seed, the partially exhausted aluminate liquor from both chains is treated with further fine seed in the second stage, in order to exhaust the aluminate liquor still further, and to raise the productivity of the precipitated aluminum hydroxide. The main feature of this process is a coarse, abrasion resistant product obtained at an improved productivity.

In U.S. Pat. No. 3,486,850, a process is projected, where the increase in productivity of the American process is obtained by intermediate cooling during the decomposition, while maintaining the production of a coarse product. However, this must be carried out in a narrowly defined temperature region, in order not to obtain too fine a product. In one example with this process, a productivity of 51 grams of $Al_2O_3$ per liter of liquor to be decomposed is quoted, with a decomposition time of approximately 40 hours.

In Light Metals 1978, Volume 2 (Proceedings of sessions 107th AIME Annual Meeting, Denver, Colo., page 95) the conversion of a European process alumina plant to the American process is described. The process selected is similar, with only minor deviations, to the previously referred to FR Pat. No. 1,391,596. The productivity thus achieved is 56.3 g $Al_2O_3$ per liter of aluminate liquor to be decomposed, with a reaction time between 40 and 50 hours. Other processes are also referred to in this publication, which, although definitely giving a coarse product, exhibit lower productivity than the described process employed.

Summarizing, previously known proposals for the improvement of the productivity of the American process do not yield much more than approximately 55 grams $Al_2O_3$ per liter of the aluminate liquor to be composed.

This value is naturally subject to certain deviations above and below, and is dependent on the initial supersaturation of the aluminate liquor and the time of reaction selected.

When the productivity is compared with that of up to 80 grams $Al_2O_3$ per liter from the European process a very considerable difference exists. Accordingly, the purpose of the invention is to improve the decomposition yield (productivity) of aluminum hydroxide in terms of grams of $Al_2O_3$ per liter from the clarified, supersaturated sodium aluminate liquor to be decomposed, while obtaining an aluminum hydroxide of coarse particle size (American type) whose fine fraction (less than 45 micrometers) does not exceed 15 percent by weight, and normally exhibits a range of between 4 to 8 percent by weight.

SUMMARY OF THE INVENTION

According to the invention, this purpose is accomplished by means of the following process steps.

1. The quantity of aluminum seed material is distributed as follows:
   1. An initial addition of fine seed (primary seed) at the beginning of the decomposition, where the amount is so calculated that the ratio between the supersaturation of the aluminate liquor as grams per liter of $Al_2O_3$ and the surface area of the above mentioned seed, expressed as square meters per liter of aluminate liquor, lies between 7 and 25 grams per square meter.

1.2 a second addition of coarse seed (secondary seed) after an interval of at least approximately two hours following the first addition, where the total amount of seed (primary and secondary seed) is at least 130 grams of $Al(OH)_3$ per liter of aluminate liquor and 2. that the temperature is regulated in the following manner:

2.1 the first stage of the referred to decomposition which corresponds to the first addition of seed material is carried out in a temperature range of 77 degrees Celsius to 66 degrees Celsius and 2.2 the second stage of the referred to decomposition which mainly corresponds to the second addition of seed material is carried out at reduced temperature which can be down to approximately 40 degrees Celsius.

The process according to the invention is a combination of individual operations, which are individually more or less well known, but which by themselves or under insufficiently employed conditions have never (as the state of the art demonstrates) attained the results which may be achieved with the invention presented here.

BRIEF DESCRIPTION OF THE DRAWINGS

Other peculiarities and advantages of the process according to the process according to the invention will be better understood by a description of the process with reference to the accompanying diagrams, where.

DETAILED DESCRIPTION

Figure 1:
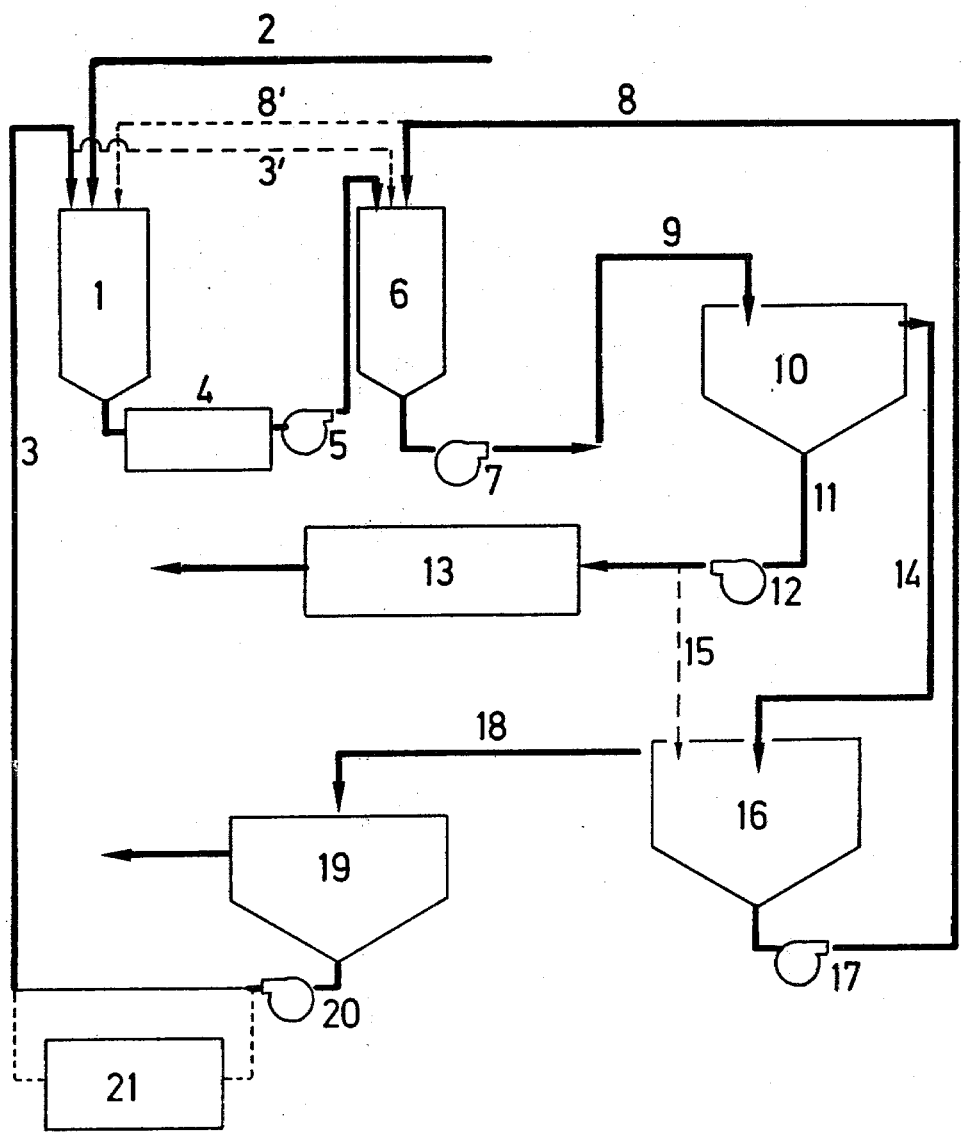
FIG. 1 illustrates a schematic diagram of the performance of the process.

FIG. 1 substantially illustrates a production arrangement for production of American type aluminum hydroxide. It has been correspondingly adapted in order to be able to carry out the process according to the invention, and that, among other items, with the possibility to carry out the decomposition in two stages with the appropriate distribution of the seed material. The schematic flow diagram in FIG. 1 shows only two decomposers, 1 and 6, arranged in series. However, normally more than one of each of decomposers 1 and 6 are installed, which are connected together either in series or parallel in batch operation, but are mostly operated continuously.

As is schematically shown, decomposer tank 1 is supplied by pipeline 2 with sodium aluminate liquor supersaturated with aluminum oxide. Measured amounts of a fine seed suspension are delivered through pipeline 3 into decomposer tank 1. The temperature, amount of seed and the molar ratio are so adjusted to the characteristics of the seed material and the plant conditions that the desired degree of agglomeration of the fine seed material occurs in decomposer tank 1, so that the equilibrium of the fine seed inventory may be maintained if necessary through the addition of a certain amount of coarse seed through pipeline 8—8'.

This agglomeration proceeds relatively rapidly in a temperature range of 77 degrees Celsius to 66 degrees Celsius. After a reaction time of two hours, it is already considerably advanced, and practically complete after six hours (see following). The suspension can now be cooled with a device 4, and then delivered by means of pump 5 into decomposer tank 6, where the decomposition proceeds to completion. In this decomposer 6, the suspension from decomposer 1 is then seeded with sufficient coarser seed material from secondary thickener 16, so that the decomposition proceeds anew to completion with a larger seed surface area and a newly raised supersaturation obtained by cooling. The cooling can also result due to contact with the surroundings through the uninsulated walls of the decomposer tank or tanks. According to the process of the invention, a sufficiently large quantity of seed material is transferred from the secondary thickener 16 through pipeline 8 into decomposer 6, and, if necessary small excess quantities of fine seed material from tertiary thickener 19 through pipeline 3—3'. This second process stage permits the seed hydrate to grow further, and according to the degree of supersaturation of the aluminate liquor, results in the formation of fine particles of hydroxide by secondary nucleation and by mechanical detachment of fine crystals. Due to the relatively high amount of secondary seed, the secondary nucleation effect is held within bounds.

The suspension is then pumped by pump 7 through pipeline 9 into primary thickener 10. In this primary thickener 10, the thickened underflow consists of product hydroxide, which is pumped through pipeline 11 by pump 12 into filtration plant 13, from which the hydroxide filter cake is sent to the calcining kiln (not shown).

The overflow of the primary thickener 10 is sent through pipeline 14 into the secondary thickener 16. The thickened underflow of the secondary thickener 16 consists of coarse seed hydroxide, which is pumped by pump 17 through pipeline 8 into decomposer tank 6. The overflow of the secondary thickener is sent through pipeline 18 into the tertiary thickener 19. The thickened underflow of the tertiary thickener 19 contains the fine seed material, which is pumped as such by pump 20 through pipeline 3 to be agglomerated into decomposer tank 1. The overflow of the tertiary thickener 19 consists of clarified, decomposed aluminate liquor, which is directed back for a new digestion operation. The plant 21 permits a washing of the fine seed material if required in order to reduce the content of organic substances, particularly sodium oxalate. The operation in question is well known.

Pipeline 15 serves to return the production hydrate in the case that a compensation in the production hydrate inventory should be shown to be necessary.

As already mentioned, under continuous operations, the process according to the invention is carried out in more than one decomposer connected in series in the place of one single decomposer 1, and after the cooling device 4, further carried out in more than one decomposer connected in series in the place of one single decomposer 6.

With sufficient cooling from the air, the cooling device 4 may be omitted, or be replaced or augmented by internal cooling in the decomposers by cooling coils, cooling jackets or such like.

The cooling of the suspension may proceed either continually or stepwise. In the latter case, each step corresponds to a cooling device. The final temperature is dependent on the sought after degree of decomposition, among other items, and may be certainly reduced to about 40 degrees Celsius. The fine seed washing system may be omitted if the fine seed is of sufficient purity, that is, little contamination of the fine seed with organic substances. The type, the behavior and the amount of these organic substances determine the necessity for washing the fine seed.

Figure 2:
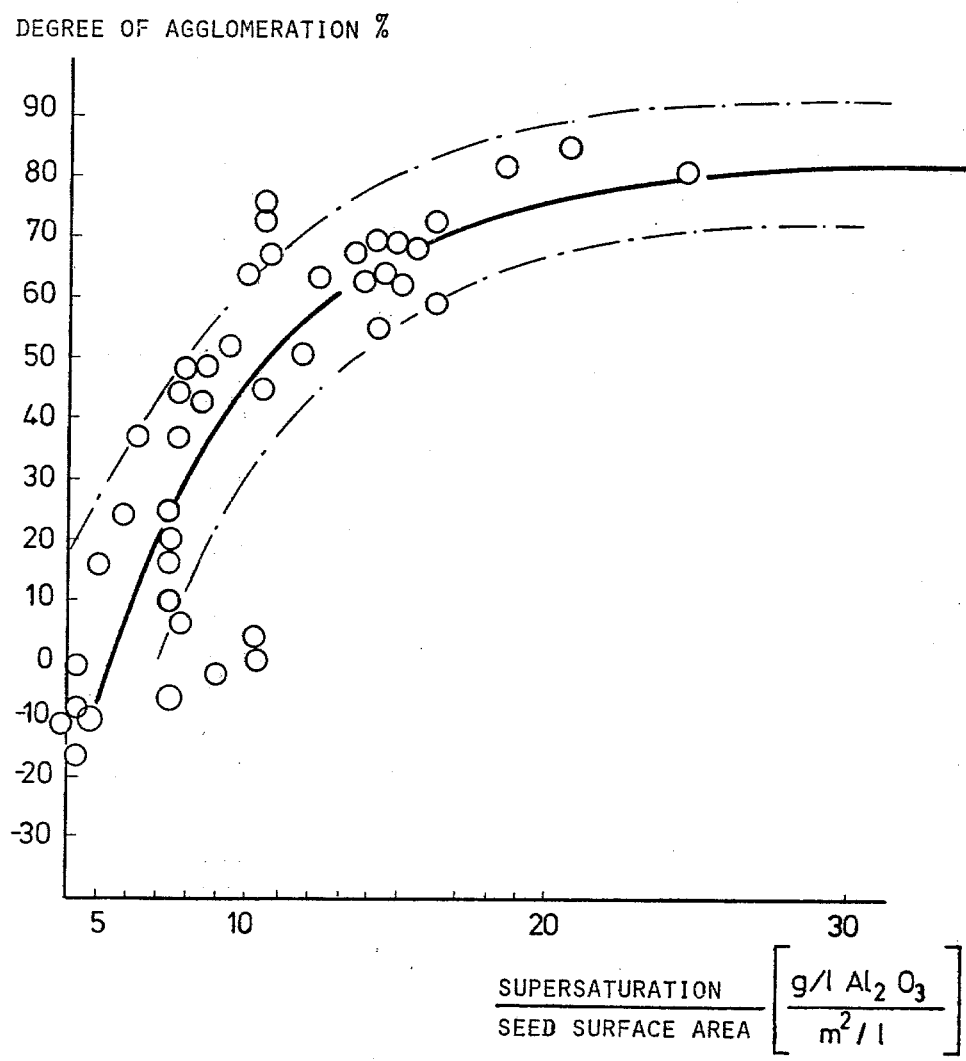
FIG. 2 is a graphical illustration which shows the degree of agglomeration of an aluminum hydroxide as a function of the relationship of the supersaturation of the aluminate liquor (as grams of $Al_2O_3$ per liter of aluminate liquor to be decomposed) to the surface area of the seed hydroxide (as square meters per liter of aluminate liquor to be decomposed) after six hours decomposition time.

In FIG. 2, the percentage degree of agglomeration is expressed as a function of the quotient "supersaturation of the liquor to be decomposed in grams $Al_2O_3$ per liter of liquor to the surface area of the seed material used in square meters per liter of liquor." The supersaturation of the liquor is determined using the thermotitration procedure, for example, and the specific surface area, for example, by means of the well-known Fisher Sub-Sieve Sizer.

The degree of agglomeration in percent is thus defined as $$(I - A \cdot 100 / I)$$

I = Fraction of seed (percent) less than 45 micrometers in size
A = Fraction of agglomeration product (percent) less than 45 micrometers in size The diagram illustrated in FIG. 2 considers a temperature range from 66 degrees Celsius to 77 degrees Celsius and a range of liquor concentrations from 70 to 150 grams $Na_2O$ caustic per liter of liquor. Agglomeration certainly occurs outside of these ranges, however the realizable results according to the invention are only partially attained.

Figure 3:
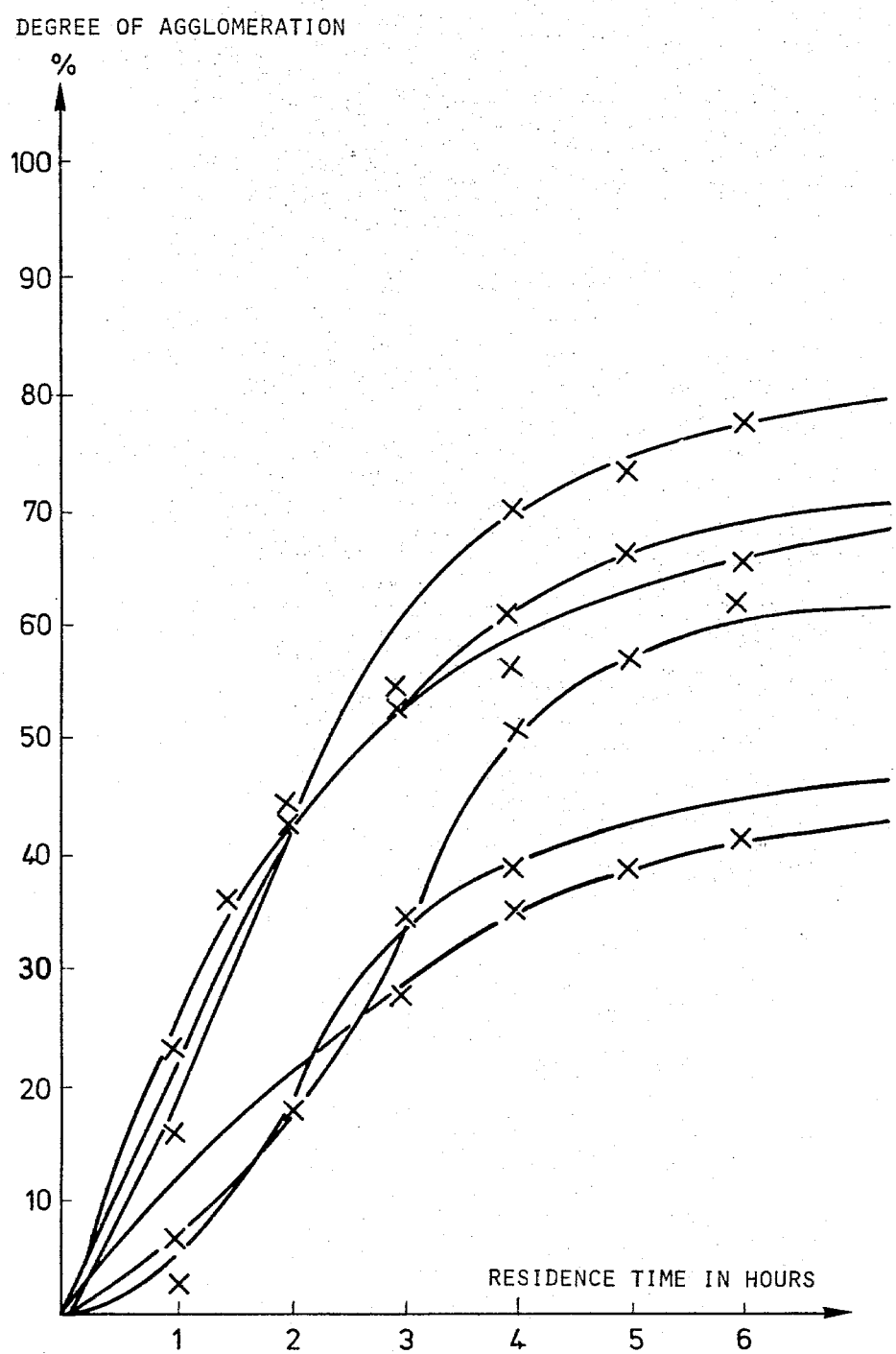
FIG. 3 is a graphical illustration which shows the degree of agglomeration as a function of the decomposition time for different amounts of seed material of partially differing constitutions.

The degrees of agglomeration represented in FIG. 2 are attained after a residence time of 6 hours in decomposer 1. Good degrees of agglomeration are also attained at residence times shorter than 6 hours, as represented in FIG. 3 (degrees of the agglomeration as function of the residence time) with different seed surface areas (square meters of seed per liter or liquor), where temperature, aluminate liquor concentration (grams per liter $Na_2O$) and degree of supersaturation are practically the same. It may be derived from this representation that after only 2 to 3 hours, approximately 50% of the total degree of agglomeration is attained. It may be further seen from FIG. 3 that after a residence time of approximately six hours, close to the maximum degree of agglomeration has been attained. (Some of this knowledge was obtained with operation batches of 600 cubic meters of supersaturated aluminate liquor).

The knowledge illustrated in FIGS. 2 and 3 and described above is used to carry out the process according to the invention for the first stage of the process, that is, for the carrying out of the agglomeration in decomposer 1.

The process in the first decomposer is carried out according to the conditions illustrated in diagrams 2 and 3, such that the fine seed hydrate added becomes coarser by means of agglomeration, so that a sufficiently coarse product results at the end of the total decomposition cycle.

The investigations in the laboratory and in the plant have shown that the necessary degree of agglomeration may be attained without effort, when the amount of fine seed in the first stage of decomposition is so fixed that the relationship of the supersaturation of the aluminate liquor to be decomposed (grams per liter $Al_2O_3$) to the surface area of this fine seed (square metres per liter) is between 7 and 25 grams per square meter, preferably between 7 and 16 grams per square meter.

It is advantageous if the duration of this first processing step is chosen to be as short as possible, however, to be long enough so that the necessary coarsening results, in order that as long as possible a residence time is available for the second stage of decomposition. According to the invention, this second stage of decomposition is carried out under conditions which are normal in European plants and which lead to high productivities, that is, at relatively low temperatures and high amounts of seed.

The investigations have shown that the temperature in this second decomposition stage must be lowered. This lowering of the temperature may be carried out continuously or in one or more successive steps. The final temperature depends on a number of factors, among which are the duration of the decomposition, the amount of fine particles formed, etc; for example, it can be reduced to about 40 degrees Celsius.

The amount of secondary seed which is added to this second stage of decomposition is less critical than that of the amount of fine seed added to the first stage of decomposition. However, it must be large enough so that a good factor at the completion of decomposition is attained, and so that secondary nucleation is held within bounds. The tests have demonstrated that the amount of this secondary seed must be large enough, so that the total amount of seed (primary and secondary seed) is at least 130 grams per liter of $Al(OH)_3$. Generally, 400 grams per liter is not exceeded.

It has also been determined that it is advantageous if the secondary seed, which, as has already been referred to, is coarser than the primary seed, is all added together at once. The examples which are presented in the following, were all carried out using this procedure.

It is obvious that the addition of the secondary seed may also be repeated, that is, in a number of portions of the total amount, without deviating from the process according to the invention.

As already mentioned, a further growth of the seed results during the second stage of decomposition (illustrated as decomposer 6), as well as the formation of fine particles of hydroxide by means of secondary nucleation and by mechanical detachment of fine crystals, these in turn occurring due to the renewed increased supersaturation of the aluminate liquor and the continuous agitation of the suspension. However, this formation of fine hydrate particles is of no significant disadvantage to the process according to the invention, in opposition to previously known processes, as, in the first processing stage of the process according to the invention, (the agglomeration in decomposer 1), even a gross occurrence of fine particles may be processed according to the agglomeration conditions depicted in FIGS. 2 and 3. The conditions in the second processing stage may therefore be chosen to obtain a maximum liquor productivity, where the associated formation of fine particles may be tolerated without representing an impairment to the process.

A precipitation of aluminum oxide of up to 80 grams of aluminum oxide per liter of liquor is attained. That is the process according to the invention achieves the productivity of the European process, and with it, a coarse aluminum hydroxide which is separated as product hydroxide is separated in the primary thickener, whose fine portion normally lies between 4 and 6 weight percent smaller than 45 micrometers.

This productivity (precipitated $Al_2O_3$ in grams per liter of liquor presented for decomposition) is also naturally dependent on the caustic liquor concentration (grams per liter $Na_2O$) of the liquor to be decomposed. If the process according to the invention is also to be considered alone for the improvement of the productivity of the aluminate liquor—regardless of which liquor concentration—then in order to attain a high productivity, the caustic liquor concentration should be correspondingly high. This is the reason why it is stated that the process is to be carried out at liquor concentrations (expressed as grams per liter $Na_2O$ caustic) which are at least 100 grams per liter, preferably at least 120 grams per liter. European plants are not normally provided with classification devices for the separation of the product, secondary and tertiary hydroxides.

On the conversion of European plants to the process according to the invention, appropriate classification devices are necessary, which however need not necessarily be gravity classifiers as in the American process, but may be any suitable known classification devices.

The American plants are furnished with the necessary classification devices, and FIG. 1 features a representation of such an arrangement. According to the process according to the invention, the conversion of American plants consists of the introduction of the agglomeration phase and the second seeding stage as well as a possible raising of the caustic liquor concentration and the introduction of cooling following the agglomeration steps.

The decomposer suspension withdrawn from the last decomposer 6 could possibly exhibit too high a solids content which renders the classification in the primary thickener more difficult or even makes it impossible. By dilution of this suspension, for example with the clear overflow liquor from tertiary thickener 19, the solids content may be adjusted, if necessary.

The following experimental examples illustrate the main aspects of the process according to the invention, however without limiting the extent of the invention.

EXAMPLE 1

1000 liters of supersaturated Bayer aluminate solution from a production plant, with an initial concentration of 120.2 grams $Na_2O$ caustic per liter and 142.3 grams $Al_2O_3$ per liter were placed in a vessel of 1.5 cubic meters capacity which had been provided with air agitation. This aluminate liquor exhibited a supersaturation of 69.9 grams of $Al_2O_3$ per liter at 71 degrees Celsius. After the addition of 50 kilograms $Al(OH)_3$ primary seed material (60.8 weight percent less than 45 micrometers) the reaction mass was adjusted to a starting temperature of 71 degrees Celsius according to a temperature profile adapted from large scale industrial operations.

The primary seed exhibited a specific surface area of 0.1148 square meters per gram, so that a surface area per liter of aluminate liquor of about 5.75 square meters per liter of aluminate liquor was employed. The relationship of the supersaturation (grams per liter $Al_2O_3$) to the seed surface area (square meters per liter) thus employed was about 12.1 grams per square meter.

After six hours, 156 kilograms of secondary seed (16.4 weight percent less than 45 micrometers) was added to the reaction mass which was then rapidly cooled by 7.5 degrees Celsius. The decomposition was allowed to proceed for a further six hours, following which a second intermediate cooling of 7.5 degrees Celsius was undertaken. The decomposition was then allowed to proceed for a further 33 hours to the end of the test. The final temperature was 50 degrees Celsius. The resultant suspension was filtered, and the aluminum hydroxide so obtained was washed and dried.

The dried filter cake, consisting of seed material and precipitated aluminum hydroxide, contained a fine portion of 14.9 weight percent less than 45 micrometers. By subtraction of the weight of the seed from the total weight of the dried filter cake, and conversion to an $Al_2O_3$ basis, a yield of 71.1 kilograms of $Al_2O_3$ was obtained. This corresponds to a specific yield of 71.1 grams of $Al_2O_3$ per liter of liquor to be decomposed.

The test results reproduced in the following table 1 are average values of two parallel tests carried out at the same time.

EXAMPLE 2

A further test was carried out as described in Example 1 with a Bayer aluminate liquor of higher starting concentration (124.6 grams $Na_2O$ caustic and 146.4 grams $Al_2O_3$ per liter). In this case, the liquor supersaturation was 70.2 grams of $Al_2O_3$ per liter. Primary seed of the same quality and amount was added. Contrary to the first test, the secondary seed was considerably finer than in Example 1 (156 kilograms with 24.9 weight percent less than 45 micrometers). The profile of the reaction mass temperature, the parameters and the point in time of the intermediate cooling were also identical to those in Example 1. The handling of the suspension and the evaluation proceeded in the same manner as described in Example 1. The dried filter cake consisting of seed material and precipitated aluminum hydroxide, contained a fine fraction of 20.1 weight percent less than 45 micrometers. A value of 72.3 grams $Al_2O_3$ per liter for the specific yield was obtained from the liquor presented for decomposition. These values are averages from three parallel tests.

EXAMPLE 3

In this test, a Bayer aluminate liquor with a concentration of 120.3 grams $Na_2O$ caustic per liter and 142.4 grams $Al_2O_3$ per liter was used. The reaction mass was mechanically agitated. The primary seed contained 54.3 weight percent less than 40 micrometers, its specific surface area being 0.1148 square meters per gram. The secondary seed contained 23.5 weight percent less than 40 micrometers. The amount of the primary seed was 50 kilograms, that of the secondary seed 156 kilograms. The supersaturation of the aluminate liquor amounted to 69.9 grams of $Al_2O_3$ per liter, so that a ratio of the supersaturation to the surface area of the primary seed of 12.1 grams per square meter was computed. The temperature profile was distinguished from that in Example 1, in that the intermediate cooling was carried out in one step of 15 degrees Celsius before the addition of the secondary seed. The final temperature was 49 degrees Celsius. The working up and evaluation was performed in the same manner as described in Example 1.

The dried filter cake consisting of seed and precipitated aluminum hydroxide contained a fine fraction of 18.9 weight percent less than 40 micrometers. The specific yield attained a value of 72.1 grams $Al_2O_3$ per liter of aluminate liquor presented for decomposition.

EXAMPLE 4

In this test, an aluminate liquor with a lower concentration than those in tests 1 to 3 was used, namely 111.7 grams $Na_2O$ caustic and 130.5 grams $Al_2O_3$ per liter. The supersaturation of the aluminate liquor mounted to 65.6 grams of $Al_2O_3$ per liter at 71 degrees Celsius. The amount and quality of primary and secondary seed were identical to those in Example 2, so that a supersaturation to primary seed surface area ratio of 11.4 grams per square meter was calculated. The same temperature profile as in Example 3 was chosen, with the intermediate cooling accomplished in one step of 15 degrees Celsius prior to the addition of the secondary seed. The final temperature was 49 degrees Celsius. The dried filter cake, consisting of seed material and precipitated aluminum hydroxide, contained a fine fraction of 19.5 weight percent less than 45 micrometers. The specific yield attained was 67.8 grams of $Al_2O_3$ per liter of aluminate liquor presented for decomposition.

EXAMPLE 5

This test was carried as described in Example 1, using a Bayer aluminate liquor with a starting concentration of 130.6 grams $Na_2O$ and 163.2 grams $Al_2O_3$ per liter. In this example, the supersaturation of the liquor amounted to 80.6 grams of $Al_2O_3$ per liter at 70 degrees Celsius. The amount of primary seed was 125 kilograms (38.6 weight percent less than 45 micrometers). The starting temperature was 70 degrees Celsius. The primary seed exhibited a specific surface area of 0.0885 square meters per gram, so that a surface area of about 11 square meters per liter was available. The ratio, supersaturation (grams per liter $Al_2O_3$) to the seed surface area (square meters per liter) thus amounted to about 7.3 grams per square meter.

After 6 hours, the reaction mass was cooled by 7.5 degrees Celsius and 105 kilograms of coarser secondary seed (14.1 weight percent less than 45 micrometers) added. The decomposition was carried out for a further 3 hours, when a second intermediate cooling of 7.5 degrees Celsius was carried out. The decomposition proceeded at this temperature for a further 3 hours. A third and last intermediate cooling of 7.5 degrees Celsius then followed. The decomposition then proceeded for a further 58 hours to the completion of the test. The final temperature was 41 degrees Celsius. The resultant suspension was filtered and the aluminum hydroxide so obtained was washed and dried. The dried filter cake consisted of seed material and precipitated aluminum hydroxide, and contained a fine portion of 18.6 weight percent less than 45 micrometers. By subtraction of the seed hydrate weight from the total weight of the dried filter cake, and on conversion to an $Al_2O_3$ basis, a yield of 83.0 kilograms of $Al_2O_3$ was obtained. This corresponds to a specific yield of 83.0 grams of $Al_2O_3$ per liter of aluminate liquor presented for decomposition.

EXAMPLE 6

In this test, a similar test procedure was used as in Example 5. The Bayer aluminate liquor had a starting concentration of 136.8 grams $Na_2O$ caustic and 174.5 grams of $Al_2O_3$ per liter. In this case, the supersaturation of the liquor amounted to 84.6 grams $Al_2O_3$ per liter at 70 degrees Celsius. The primary seed amount used was 125 kilograms (38.6 weight percent less than 45 micrometers), and the starting temperature was 70 degrees Celsius.

The primary seed exhibited a specific surface area of 0.0885 square meters per gram, so that a surface area of 11 square meters per liter was available. The ratio supersaturation (grams per liter $Al_2O_3$) to the seed surface area (square meters per liter) thus amounted to about 7.7 grams per square meter.

After six hours, the reaction mass was cooled by 7.5 degrees Celsius, and 105 kilograms of coarser secondary seed (14.1 weight percent less than 45 micrometers) added. The decomposition was carried out for a further 3 hours, when a second intermediate cooling of 7.5 degrees Celsius was carried out.

The decomposition proceeded at this temperature for a further 3 hours. A third and last intermediate cooling of 7.5 degrees Celsius then followed. The decomposition then proceeded for a further 88 hours to the completion of the test. The final temperature was 41 degrees Celsius. The resultant suspension was filtered, and the aluminum hydroxide so obtained was washed and dried. The dried filter cake consisted of seed material and precipitated aluminum hydroxide, and contained a fine portion of 16.5 weight percent less than 45 micrometers. By subtraction of the seed hydrate weight from the total weight of the dried filter cake, and on conversion to an $Al_2O_3$ basis, a yield of 91.7 kilograms of $Al_2O_3$ was obtained. This corresponds to a specific yield of 91.7 grams of $Al_2O_3$ per liter of aluminate liquor presented for decomposition. The coarsening and the high yields which characterize the process, are listed in the following Table 1.

TABLE

| | YIELD | FINE PORTION LESS THAN 45 MICROMETERS | | | | | |
|---|---|---|---|---|---|---|---|
| | | SEED MATERIAL | | | | PRODUCT seeded plus precipitated material | |
| | | PRIMARY | | SECONDARY | | Σ | | material | |
| Example | $Al_2O_3$ g/l | % | $Al(OH)_3$ g/l | % | $Al(OH)_3$ g/l | $Al(OH)_3$ g/l | % | $Al(OH)_3$ g/l |
| 1 | 71.1 | 60.8 | 30.4 | 16.4 | 25.6 | 56.0 | 14.9 | 46.9 |
| 2 | 72.3 | 60.8 | 30.4 | 24.9 | 38.3 | 69.2 | 20.1 | 63.6 |
| 3 | +72.1 | +54.2 | +27.1 | +23.5 | +36.7 | +63.8 | +18.9 | +59.8 |
| 4 | 67.8 | 60.8 | 30.4 | 24.9 | 38.8 | 69.2 | 19.5 | 60.4 |
| 5 | 83.0 | 38.6 | 48.2 | 14.1 | 14.8 | 63.0 | 18.6 | 66.3 |
| 6 | 91.7 | 38.6 | 48.2 | 14.1 | 14.8 | 63.0 | 16.5 | 61.0 |

+FRACTION LESS THAN 40 MICROMETERS

It may be derived from the table, that after the return of primary and secondary seed hydroxides of the same amount and similar constitution to those used, a product hydroxide with a very low fine portion can be produced, for example 3 to 5 weight percent less than 45 micrometers, as is required for the production of sandy aluminum oxide. Further, the productivity (yield) of the aluminate liquor is extremely high, and has never been achieved on a practical basis for the manufacture of aluminum oxide of coarse particle size.

What claims is claimed:

1. A process for the manufacture of coarse aluminum hydroxide having a maximum of 15 weight percent of particles with a diameter less than 45 micrometers by a two stage decomposition of a supersaturated alkaline aluminate solution, by the addition of aluminum hydroxide seed material of different quality to said aluminate solution in each of said two stages, which comprises
    (a) distributing the quantity of aluminum hydroxide seed material as follows: adding to said aluminate solution a first addition of fine seed material (primary seed material) in a first stage of the decomposition, where the quantity thereof is so calculated that the ratio between the supersaturation in grams of $Al_2O_3$ per liter of aluminate liquor and the surface area of said seed material expressed in square meters per liter of aluminate liquor lies between 7 and 25 grams per square meter; and
    adding to said aluminate solution a second addition of coarse seed material (secondary seed material) in a second stage of the decomposition after an interval of approximately two hours after the first addition such that the total amount of seed material (primary and secondary seed material) is at least 130 grams $Al(OH)_3$ per liter of aluminate liquor; and
    (b) regulating the temperature of the decomposition in the following manner:
    conducting said first stage of the decomposition in a temperature range of 77 degrees Celsius to 66 degrees Celsius; and
    conducting said second stage of the decomposition at a reduced temperature which can be down to approximately 40 degrees Celsius.

2. A process according to claim 1 wherein the time of the first decomposition stage is about six hours.

3. A process according to claim 1 wherein the caustic liquor concentration expressed in grams of $Na_2O$ caustic per liter is at least 100 grams per liter.

4. A process according to claim 1 including the step of continuously applying cooling at said second stage of the decomposition.

5. A process according to claim 1 including the step of applying cooling at the second stage of the decomposition in one or more steps.

6. A process according to claim 1 including applying cooling at said second stage of the decomposition and adding said coarse seed material immediately before, during, or immediately after said cooling.

7. A process according to claim 1 wherein the ratio of supersaturation of the liquor to the surface area of the primary seed material is between 7 and 16 grams per square meter.

8. A process according to claim 1 wherein the total amount of seed in said second stage does not exceed 400 grams per liter.

9. A process according to claim 1 wherein said secondary seed material is added at one time.

10. A process according to claim 1 including the step of applying cooling following said first stage of the decomposition.

* * * * *